(12) United States Patent
Trass et al.

(10) Patent No.: US 9,179,692 B2
(45) Date of Patent: Nov. 10, 2015

(54) PRODUCTION OF PROTEIN ISOLATES

(76) Inventors: Olev Trass, Toronto (CA); Eduard Tearo, Tallinn (EE); Toivo Trass, Tallinn (EE)

( * ) Notice: Subject to any disclaimer, the term of this patent is extended or adjusted under 35 U.S.C. 154(b) by 1336 days.

(21) Appl. No.: 12/997,393

(22) PCT Filed: Jun. 9, 2009

(86) PCT No.: PCT/CA2009/000813
§ 371 (c)(1),
(2), (4) Date: Apr. 5, 2011

(87) PCT Pub. No.: WO2009/149551
PCT Pub. Date: Dec. 17, 2009

(65) Prior Publication Data
US 2011/0177582 A1 Jul. 21, 2011

Related U.S. Application Data

(60) Provisional application No. 61/061,026, filed on Jun. 12, 2008.

(51) Int. Cl.
*C07K 1/14* (2006.01)
*A23K 1/14* (2006.01)
*A23J 1/14* (2006.01)

(52) U.S. Cl.
CPC ... *A23K 1/146* (2013.01); *A23J 1/14* (2013.01)

(58) Field of Classification Search
CPC .................................. A23K 1/146; A23J 1/14
See application file for complete search history.

(56) References Cited

U.S. PATENT DOCUMENTS

| | | | |
|---|---|---|---|
| 3,586,662 A * | 6/1971 | O'Connor ..................... | 530/377 |
| 4,332,719 A | 6/1982 | Lawhon et al. | |
| 4,624,805 A | 11/1986 | Lawhon | |
| 4,889,921 A | 12/1989 | Diosady et al. | |
| 5,580,959 A | 12/1996 | Cook et al. | |
| 2004/0009263 A1 | 1/2004 | Liu et al. | |
| 2005/0176936 A1 | 8/2005 | Neumuller | |
| 2006/0134310 A1 | 6/2006 | Cho et al. | |
| 2007/0237877 A1 | 10/2007 | Diosady et al. | |

FOREIGN PATENT DOCUMENTS

| | | |
|---|---|---|
| CA | 2363451 | 11/2001 |
| EP | 0838513 | 4/1998 |
| EP | 1365660 | 9/2007 |
| WO | 2008/144939 | 12/2008 |

OTHER PUBLICATIONS

Wilson H. E., The oil mill gazetteer, Official organ of the National oil Mill Superintendents's Association, published in Jul. 1917, vol. 19, No. 1, pp. 7-27.*
Jung S. et al., Functionality of soy protein produced by enzyme-assisted extraction, paper No. J11184 in JAOCS, Jan. 2006, vol. 83, No. 1, pp. 71-78.*
Lanzani A et al, "Removal of chlorogenic acid from sunflower seeds and meals." (Abstract) Proceedings of the 13th World Congress Symposium 9, Sep. 1, 1979.
Supplementary European Search Report and Opinion, European Patent Application No. 09761209, mailed Jul. 13, 2011.
Corrected Version European Search Opinion, European Patent Application No. 09761209, mailed Sep. 2, 2011.
Zhang S.B. et al., "Optimization of the Aqueous Enzymatic Extraction of Rapeseed Oil and Protein Hydrolysates" J. Amer. Oil Chem. Socl, Jan. 2007, vol. 84, pp. 97-105, ISSN:0003-021X.
International Search Report and Written Opinion of the International Searching Authority, International Patent Application No. PCT/CA2009/000813, mailed Aug. 17, 2009.

\* cited by examiner

*Primary Examiner* — Satyendra Singh
(74) *Attorney, Agent, or Firm* — Michael Best & Friedrich LLP

(57) ABSTRACT

Embodiments of the process for isolating proteins from a defatted meal comprise extracting the defatted meal with an acidic solvent at a pH of between 2 and 6 to obtain a mixture of treated meal and a first solution of proteins. The process further comprises extracting the treated meal with an alkaline solvent at a pH of between 9 and 12.5 to obtain a mixture of meal residue and a second solution of proteins. The meal residue is separated from the second solution of proteins, and the proteins are separated from the second solution of proteins to obtain one or more protein products.

5 Claims, 3 Drawing Sheets

PRODUCTION OF PROTEIN ISOLATES

CROSS REFERENCE TO RELATED APPLICATIONS

This application claims the benefit of International Patent Application No. PCT/CA2009/000813, filed Jun. 9, 2009, which claims the benefit of and priority to U.S. Provisional Patent Application No. 61/061,026, filed Jun. 12, 2008, the entire contents of both are incorporated herein by reference.

FIELD

The application relates to the isolation of proteins. More specifically, the application relates to a process for isolating protein products from a defatted meal.

BACKGROUND

Seeds such as *brassica* seeds, and especially rapeseed, are potential sources of high-quality protein. After oil extraction, rapeseed meal contains about 38% protein compared to approximately 44% in soybean meal, the latter being widely used for feed and food purposes. Proteins contained in rapeseed are rich in lysine and contain adequate quantities of methionine, both of which are limiting amino acids in most cereal and oilseed proteins.

U.S. Pat. Nos. 4,889,921 and 6,905,713 (each to Diosady) disclose a process for isolating proteins from defatted rapeseed meal. The process comprises extracting the meal with an alkaline solvent, removing the meal residue, adjusting the pH of the extraction solution to obtain a precipitated protein product, and separating the unprecipitated protein from any undesirable components in the solution by membrane filtration.

SUMMARY

In one broad aspect, the invention comprises a process for isolating proteins from a defatted meal. Embodiments of the process comprise extracting the defatted meal with an acidic solvent at a pH of between 2 and 6 to obtain a mixture of treated meal and a first solution of proteins. The process further comprises extracting the treated meal with an alkaline solvent at a pH of between 9 and 12.5 to obtain a mixture of meal residue and a second solution of proteins. The meal residue is separated from the second solution of proteins, and the proteins are separated from the second solution of proteins to obtain one or more protein products.

Embodiments in accordance with this broad aspect may be advantageous because the protein products may be of high quality. That is, the protein products may be low in glucosinolates, phytates and phenolics. Further, the protein products may have good organoleptic properties. That is, they may have good color and taste, and thus may be suitable for a wide range of uses.

Furthermore, in some embodiments the protein product may comprise up to 3 different protein products: a first protein product precipitated at the isoelectric point (referred to hereinafter as a precipitated protein product), a second protein product fully soluble at the isoelectric conditions (referred to hereinafter as a soluble protein product), and a third protein product which is a meal residue suitable for use as an animal feed. The first and second products may have good fat and water binding and emulsion stabilizing properties and may be used, for example, in processed meat products. The soluble protein also has a range of other uses, such as in "power drinks". These products may be free of the allergens found in soybeans; hence, useful for people suffering from soybean and similar allergies.

In some embodiments, the acidic extraction is carried out in the presence of cellulase enzymes. In other embodiments, the treated meal is incubated with cellulase enzymes prior to extracting the treated meal with the alkaline solvent. Such embodiments may be advantageous because the extractability of the protein product may be significantly enhanced, thus giving a higher yield of protein product.

In some embodiments the first solution of proteins may be separated from the treated meal prior to extracting the treated meal with an alkaline solvent. In some such embodiments, the proteins may be separated from the first solution to obtain an acid-extracted protein product.

In some embodiments, the alkaline extraction is carried out in the presence of the first solution of proteins, such that the second solution of proteins comprises the proteins extracted in the acidic extraction and the proteins extracted in the alkaline extraction.

In some embodiments, the proteins are separated from the second solution of proteins by adjusting the pH of the second solution of soluble proteins to between about 2 and about 9 to obtain a precipitated protein product and a third solution of proteins; and separating the proteins from the third solution to obtain a soluble protein product.

In some embodiments, the proteins are separated from the second solution of proteins by separating fine particulates from the second solution of proteins to obtain a feed concentrate; adjusting the pH of the second solution of proteins to between about 2 and about 8 to obtain a precipitated protein product and a third solution of proteins; and separating the proteins from the third solution to obtain a soluble protein product.

In some embodiments, the defatted meal is selected from the group consisting of rapeseed meal, soybean meal, cottonseed meal, and sunflower seed meal.

BRIEF DESCRIPTION OF THE DRAWINGS

Exemplary embodiments of the invention will be described below with reference to the following figures.

DETAILED DESCRIPTION

Figure 1:
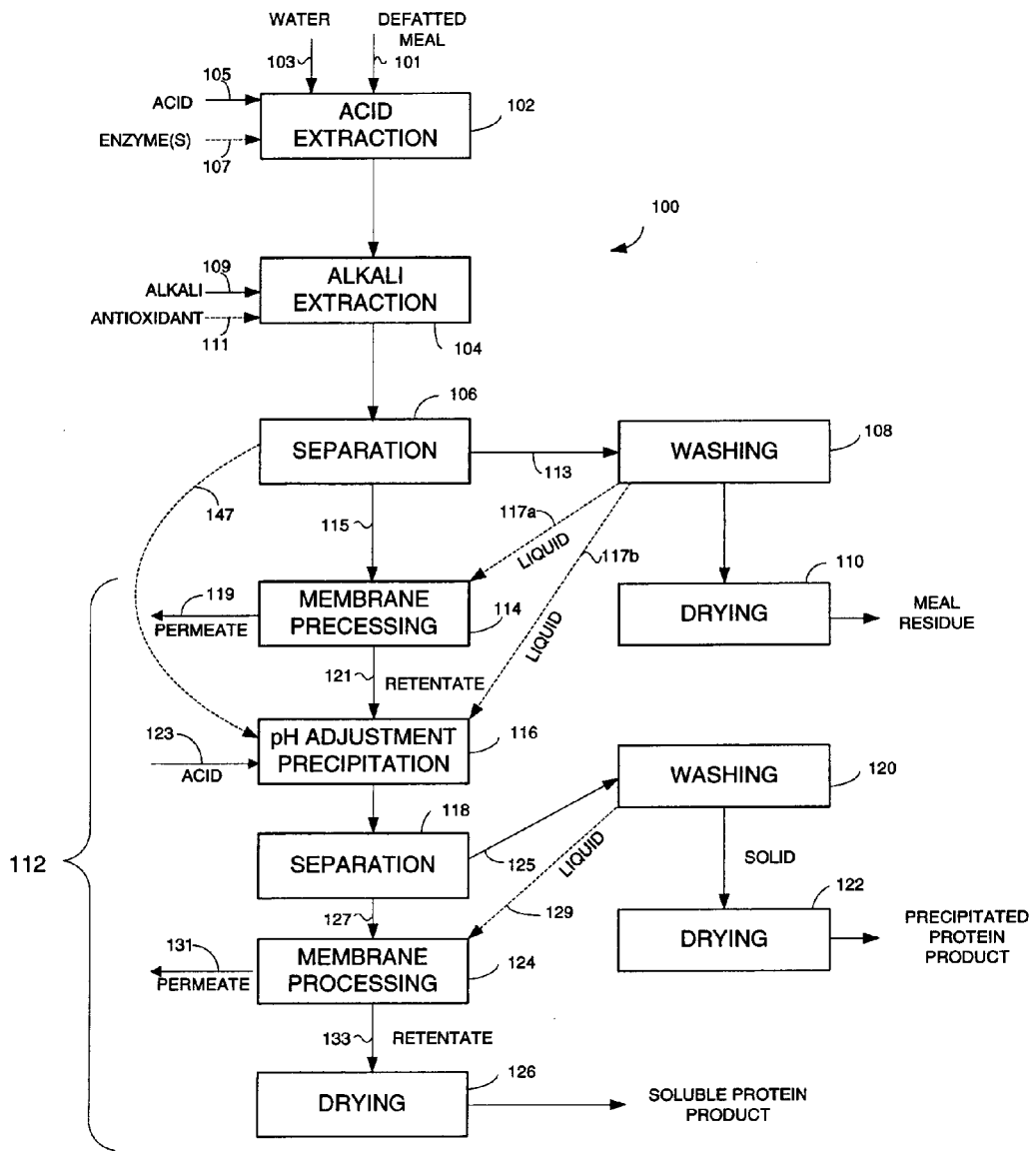
FIG. 1 is a flow-chart showing an embodiment of a process in accordance with the present invention.
Figure 2:
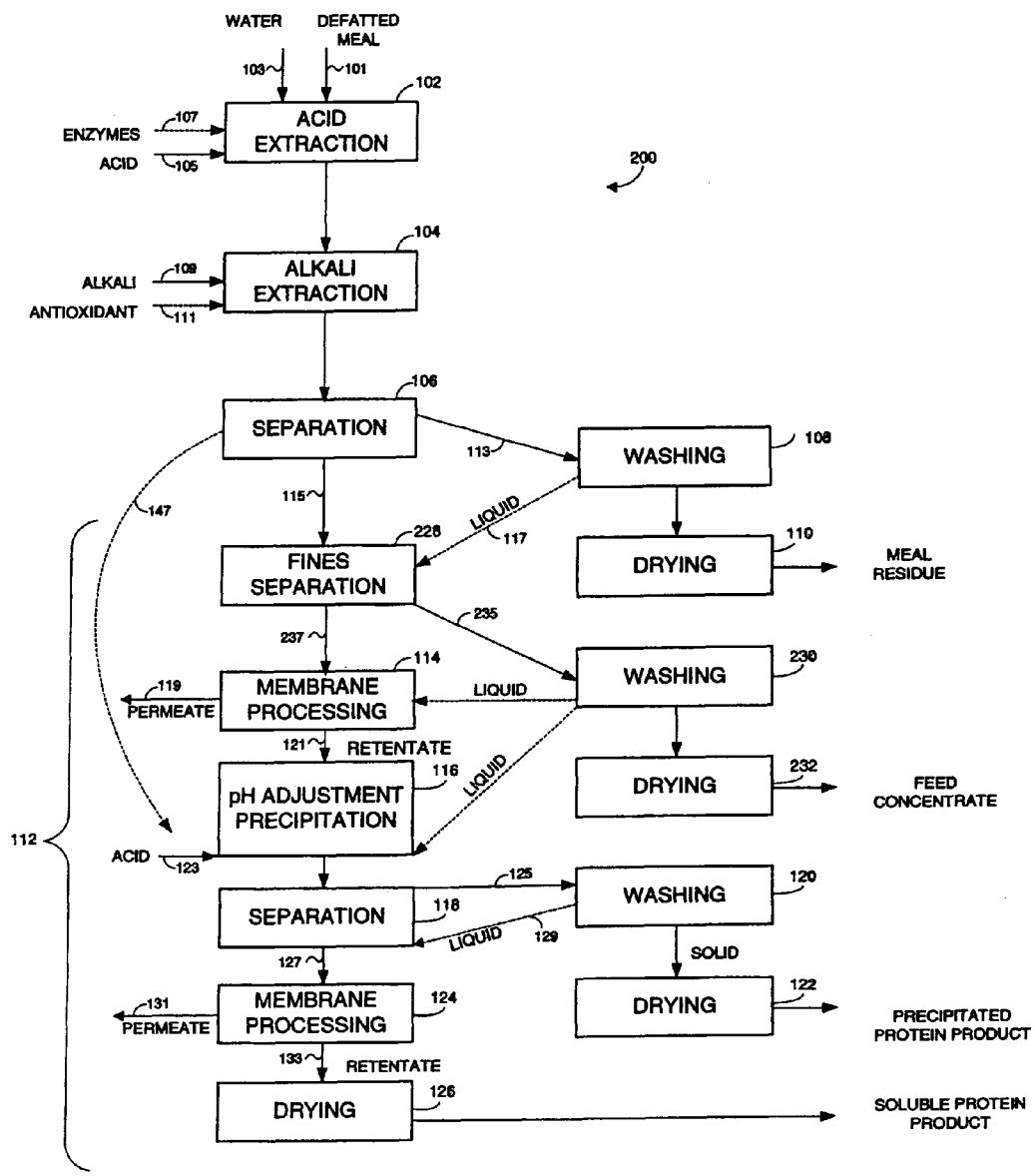
FIG. 2 is a flow-chart showing an alternate embodiment of a process in accordance with the present invention.
Figure 3:
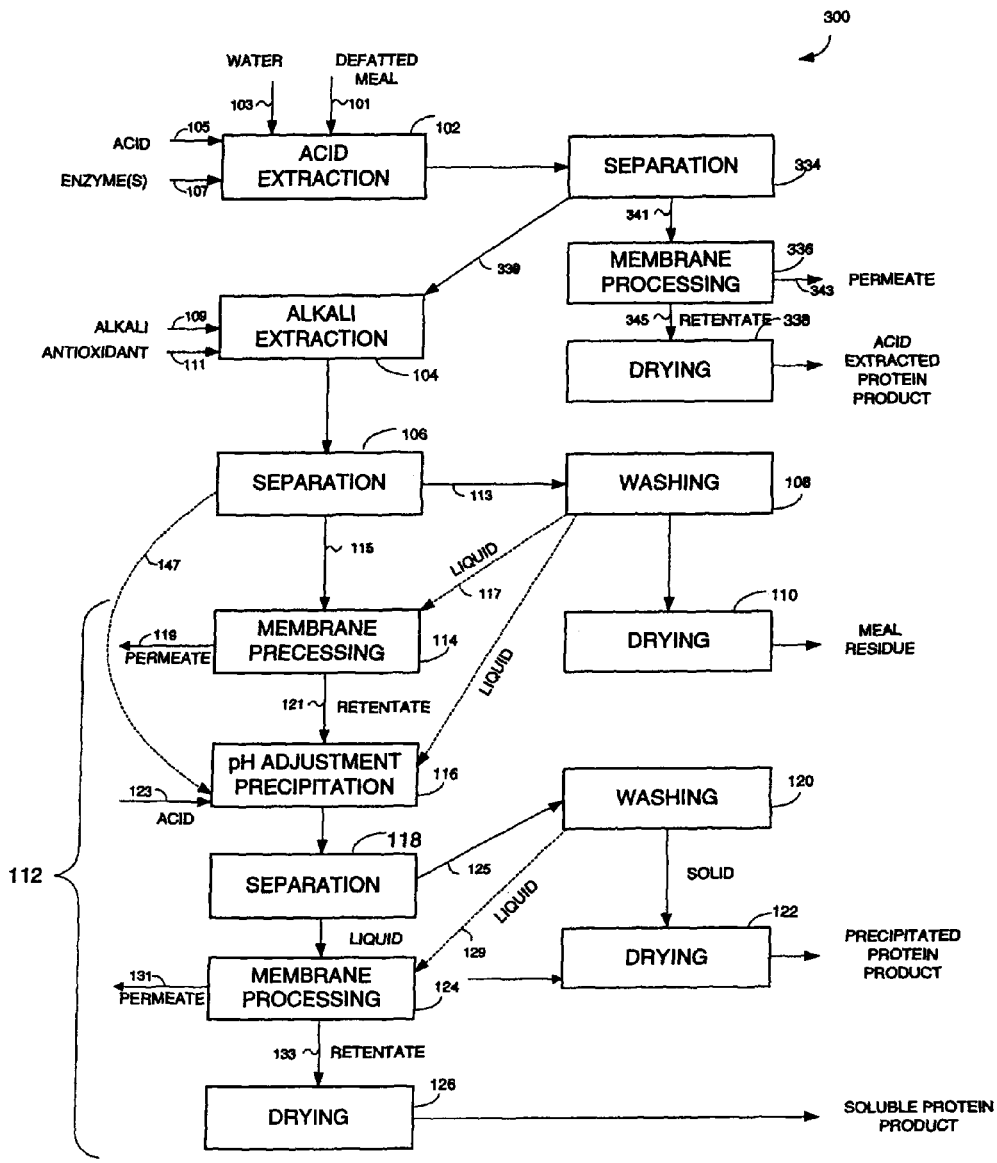
FIG. 3 is a flow-chart showing an alternate embodiment of a process in accordance with the present invention.

Embodiments of processes for isolation of proteins from a defatted meal are shown in FIGS. 1-3. The defatted meal may be, for example, rapeseed meal, canola seed meal, flax seed meal, soybean meal, cottonseed meal, sunflower seed meal, or other suitable protein-rich meals.

Referring to FIG. 1, a first embodiment of a process 100 for isolation of proteins from a defatted meal is shown. In the embodiment shown, process 100 begins at step 102, in which the defatted meal is extracted with an acidic solvent at a pH of between 2 and 6 to dissolve some of the protein in the meal. The acid extraction produces a mixture of treated meal, and a first solution of proteins.

The acidic extraction step (step 102) may be performed in a variety of ways. For example, the starting meal (arrow 101) may be mixed with water (arrow 103) to form a slurry. In some embodiments, the water to meal ratio in the slurry may be between about 4 and about 30. Preferably, the water to meal ratio is between about 8 and about 10. The slurry may be stirred, and as the slurry is stirred, its pH is may be adjusted to between about 2 and about 6 by adding aqueous acid (arrow 105). Preferably, the pH is adjusted to between about 4.5 and about 5. The aqueous acid may be, for example, phosphoric acid, acetic acid, hydrochloric acid, or other suitable acid. In some embodiments, the pH may be maintained for up to several hours or more. In the preferred embodiment, the pH may be maintained for between about 5 minutes and 60 minutes. In the most preferred embodiment, the pH is maintained for 15-60 minutes.

Optionally, the acid extraction may be carried out in the presence of one or more enzymes (shown by dotted arrow 107). Such enzymes may include a variety of enzymes which serve to break down the hemicellulose/cellulose structure of the meal to liberate the proteins embedded in the structure. For example, the enzymes may include one or more of cellulase, pectinase, xylanase, or hemicellulase. As the enzymes are added, the temperature of the mixture may be raised towards the temperature that is optimal for the activity of the enzyme. This temperature may vary depending on the particular enzyme used, and may be, for example, between about 30° C. and about 60° C.

Following the acidic extraction, the treated meal is extracted with an alkaline solvent at a pH of between about 9 and about 12.5 in order to dissolve the alkali-soluble proteins (step 104). The alkali extraction produces a meal residue, and a second solution of proteins.

In the embodiment shown in FIG. 1, step 104 is carried out in the presence of the first solution of proteins formed in step 102. That is, the first solution of proteins and the treated meal are not separated from each other. Accordingly, the second solution of proteins may comprise the acid soluble proteins as well as the alkali soluble proteins. In alternate embodiments, as will be described further hereinbelow, the first solution of proteins may be separated from the treated meal prior to extracting the treated meal with the alkaline solvent.

The alkaline extraction (step 104) may be performed in a variety of ways. For example, an aqueous alkaline solution (arrow 109) may be added to the treated meal and stirred until the pH reaches a target value of between about 9 and about 12.5. Preferably, the pH is between about 11 and about 12. The aqueous alkaline solution may comprise, for example, NaOH, $Na_2CO_3$, KOH, or another suitable base. The pH may be maintained at the target value for between about 5 minutes and about 60 minutes. Preferably, the pH is maintained at the target value for between about 30 minutes and about 60 minutes.

Optionally, an antioxidant may be added together with the alkaline solution (shown by dotted arrow 111). The antioxidant may be, for example, sodium ascorbate or sodium sulfite.

Following the alkaline extraction, at step 106, the meal residue (arrow 113) may be separated from the second solution of proteins (arrow 115). This step may comprise, for example hydrocyclone separation, filtration or centrifugation. The meal residue may then optionally be washed (step 108), and dried (step 110). The washing step may comprise, for example, an initial wash with aqueous alkali, a subsequent wash with water, and a final neutralization step. The resulting meal residue may be used, for example, as animal feed.

In an alternate aspect of this embodiment, steps 106 and 108 may be combined, for example by using countercurrent extraction.

After the meal residue is separated from the second solution of proteins, the proteins may be extracted from the second solution of proteins. In the embodiment shown in FIG. 1, the step of separating the proteins from the second solution of proteins (step 112) comprises steps 114-126.

At step 114, the second solution of proteins is subjected to membrane processing to yield a permeate (arrow 119), which can be discarded, and a retentate (arrow 121), which comprises the second solution of proteins. Optionally, the washing liquids from step 108 may be added to the second solution prior to membrane processing (shown by dotted arrows 117).

The membrane processing may comprise, for example, an ultrafiltration step to concentrate the protein fraction, followed by a diafiltration step to purify the protein solution by removal of low molecular weight undesirable components. Membranes with molecular weight cut-offs of 3-50 kilodaltons (kDa) may be used. Advantageously, membranes with molecular weight cut-offs of 5-10 kDa are used. Based on the concentration of the protein solution, the concentration factor (CF) in ultrafiltration may be varied from about 2 to about 20, and the number of diavolumes (DV) may also vary from about 2 to about 10. Preferably, the CF and DV values are set at between about 4 and about 5. Preferably, the pH of the diafiltration water is adjusted to the same value as the solution so that no pH change takes place during diafiltration. Preferably, to prevent phenolics from binding to the protein, the ionic strength of the solution is relatively high, for example between about 0.05 and about 0.10 moles/L. If the acid-base reaction has not generated enough NaCl to reach this ionic strength, more may optionally be added.

Following membrane processing, at step 116, the pH of the second solution of proteins may be adjusted to between about 2 and about 9 to form a precipitated protein and a third solution of proteins. Preferably, the pH is adjusted to between about 4 and about 6. Optionally, the washing liquids from step 108 may be added to the second solution prior to adjusting the pH (shown by dotted arrows 117a, 117b).

In order to adjust the pH, an acid (arrow 123) may be added to the membrane-processed solution. The acid may be, for example, hydrochloric acid, acetic acid, phosphoric acid, or another suitable acid. Depending on objectives and the isoelectric point of the protein variety, the pH range may vary from 2 to 9.

The adjusted pH may be maintained for up to several hours or more for protein aggregation. Preferably, the adjusted pH is maintained for between 5 to 30 minutes.

The resultant precipitated protein product may then be separated from the third solution of proteins (step 118), for example by hydrocyclone separation, filtration or centrifugation. The separated precipitated protein product (arrow 125) may then optionally be washed and neutralized (step 120) and dried (step 122), to provide a precipitated protein product. The precipitated protein product may be usable, for example, in food such as processed meat products. Optionally, a small amount of lecithin may be added to improve powder properties.

After the precipitated protein product is separated from the third solution of proteins, the third solution of proteins (arrow 127) may be purified and dried to obtain a soluble protein product. For example, the third solution may be combined with the wash water from step 120 (arrow 129), and concentrated further by membrane processing (step 124) to produce a permeate (arrow 131), which can be discarded, and a retentate (arrow 133), which comprises the third solution of proteins. The membrane processing may comprise, for example, ultrafiltration and diafiltration. The CF may be, for example, 2-8 with a DV of 1-6. The concentrated and purified protein solution may then be dried (step 126) to obtain a soluble protein product. Optionally, a small amount of lecithin may be added to improve powder properties.

Referring now to FIG. 2, an alternate embodiment of a process 200 for isolation of proteins from a defatted meal is shown. Process 200 is similar to process 100, however, in step 112, an additional product is obtained.

Process 200 comprises the additional steps of separating the fine particulates from the second solution of proteins (step 228) prior to membrane processing. The fine particulates (arrow 235) may be washed (step 230), and dried (step 232) to yield a feed concentrate. The feed concentrate may be used, for example, as animal feed.

The washing liquid from step 230 may optionally be returned to the second solution of proteins (arrow 237), for example prior to or during membrane processing (step 114), or prior to or during pH adjustment (step 116).

Referring now to FIG. 3, a further alternate process 300 for isolation of proteins from defatted meal is shown. Process 300 is similar to process 100, however, an additional protein product is obtained.

As mentioned hereinabove, in the embodiment shown in FIG. 1, step 104 is carried out in the presence of the first solution of proteins formed in step 102. In the embodiment shown in FIG. 3, the process 300 comprises the additional steps of separating the first solution of proteins from the treated meal prior to extracting the treated meal with an alkaline solvent. This may be done either to remove some impurities early on and/or to obtain a different, acid-extracted protein product.

Process 300 comprises separating the first solution of proteins from the pretreated meal (step 334), for example by hydrocyclone separation, filtration, or centrifugation. The treated meal (arrow 339) is then subjected to alkali extraction, at step 104. The first solution of proteins (arrow 341) may then be purified, for example by membrane processing (step 336) to yield a permeate (arrow 343) which can be discarded, and a retentate, which comprises the first solution of proteins.

The first solution of proteins may then be dried (step 338) to yield an acid-extracted protein product.

It will be appreciated that steps 334-338 shown in FIG. 3 may additionally be carried out with the embodiment of FIG. 2.

An additional alternate aspect is shown by dotted arrow 147 in FIGS. 1, 2, and 3. According to this aspect, the first membrane processing step (step 114) may be bypassed, and the second solution of proteins may be fed from the step 106 to step 116. Following separation (step 118), washing (step 120), and drying (step 122), a good quality precipitated protein product may be obtained. The reason for considering and using such an alternative process sequence arises because membrane processing at acidic conditions is simpler and much faster than at the higher viscosity and more readily membrane-plugging, alkali conditions.

EXAMPLES

Example 1

Example 1 shows the influence of enzymes on protein solubility from rapeseed meal. The sequel and conditions were as follows.

To 100 grams of meal, 800 g of water was added (to obtain a Liquid/Solid ratio of eight), along with enough hydrogen chloride (HCl, hydrochloric acid) to bring the pH value to 5.0. The slurry was maintained at 40° C. for 60 minutes, with gentle stirring. The wet solids (i.e. the treated meal) were then separated from the liquid (i.e. the first solution of proteins) by screening. The liquid was then centrifuged to remove the remaining solid particles. The clear liquid was analyzed for both protein content and moisture content. Similarly, the wet solids were analyzed for both protein and water content so as to allow mass balances to be made.

Enough water was then added to the wet solids to replace the removed liquid along with enough sodium hydroxide (NaOH, alkali) to bring the pH value to 11.0. The slurry was maintained at 40° C. for another 15 minutes, with gentle stirring. The liquid (i.e the second solution of proteins) was again separated from the solids (i.e. the meal residue) and both were analyzed as before. All along, all quantities were also weighed.

The above procedure was carried out without any enzymes and with several different enzymes added. All balances were good, both for protein and total mass, typically within 2-3 percent.

Concentrations of the two extracted solutions and the residual solids are given in Table 1.

TABLE 1

|  | Test 1: No Enzyme used (Base case) | Test 2: Enzeco Cellulase 0.4 g | Test 3: Pectinase (Novozyme) 0.4 g | Test 4: Pectinase 0.8 g | Test 5: Enzeco Xylanase 0.4 g |
| --- | --- | --- | --- | --- | --- |
| First Solution of Proteins | | | | | |
| % protein | 0.68 | 0.68 | 0.62 | 0.68 | 0.70 |
| Second Solution of Proteins | | | | | |
| % protein | 1.01 | 0.92 | 1.02 | 1.39 | 1.11 |
| Meal Residue | | | | | |
| % protein | 6.53 | 6.18 | 5.35 | 4.87 | 5.47 |
| % moisture | 85.2 | 84.7 | 86.1 | 87.4 | 82.2 |

Example 2

Example 2 shows the effect of enzymes on the extractability of proteins from meal.

For each run, 15 g of unground meal was mixed with 120 g of distilled water to have a solvent-to-meal ratio (R) of 8 in a 250 ml beaker by stirring on a magnetic stirring plate at 45° C. for 120 minutes. The enzyme was dissolved in distilled water before mixing with rapeseed meal. The enzyme was added at 0.15 g per 15 g unground meal. 5N hydrochloric acid was added to maintain pH 4.5, to yield a treated meal, and a first solution of proteins. After 2 hours of incubation the pH was increased to 12 and maintained constant by adding NaOH, to yield a mixture of meal residue, and a second solution of proteins. After 15 minutes, the mixture was centrifuged at 6300 rpm for 20 min. The second solution of proteins was separated from the meal residue and vacuum filtered with Whatman 541 filter paper. Both products were weighed and the protein content was measured. The meal residue was oven dried at 105° C. for 24 hr for moisture content and the moisture content was taken into consideration for protein extractability calculations. A single extraction run was done for most of the enzymes.

As shown in Table 2, Enzeco hemicellulase was found to have the most effect on protein extractability. Enzeco cellulase CEP and Viscozyme L increased the protein extractability less effectively than Enzeco hemicellulase which gave protein extractability of 67% compared with the control of 51.1%. The other enzymes tested did not improve the protein extractability. The protein extractability of meal with Hemicellulase released more protein to the aqueous media, due to the rupture of the cell wall.

TABLE 2

| Enzyme | Extractability, % |
| --- | --- |
| No enzyme treatment | 51.0 ± 1.4 |
| Enzeco hemicellulase | 65 |
| Enzeco xylanase S | 52 ± 1.4 |
| Enzeco cellulase CEP | 60 |
| Enzeco cellulase CE-2 | 49 |
| Viscozyme L | 60 |
| Sigma cellulase + Fluka pectinase | 53 |
| Sigma hemicellulase | 52 |

Example 3

Example 3 shows the effect of enzyme treatment, pH, temperature, and grinding of meal during the alkaline extraction step. No acid extraction was performed in this example.

The first series of tests (tests 1-3) started with an alkaline extraction stage at pH 11. Typically 30 g of unground meal was extracted with 540 g of water for 30 min, at various temperatures. The suspension was centrifuged at 6000 rpm for 20 min. The solids were washed twice with distilled water (R=6). The washed solids were oven dried at 105° C. for 24 hr. The collected extract and subsequent wash liquids were combined, to form the alkaline extract solution, then heated to 50° C., and NaCl was added to help prevent complexes forming between the anti-nutritional compounds, particularly phenolic compounds, and the proteins. The solution was then cooled to 40° C. in order not to damage the membrane cartridge. The pH of solution was also lowered to below pH 11 for the same reason. The heat- and salt-treated extract then passed through a 5 kD regenerated cellulose membrane cartridge (PLCCC, Millipore) in ultrafiltration mode to a concentration factor of 5 followed by diafiltration with a diavolume of 5. The diawater used was adjusted to the same salt concentration and pH as the feed solution, or alkaline extract. Some of the protein in the permeate from the membrane processing stages was then precipitated at pH 5.1 to produce a precipitated protein isolate and a soluble protein isolate solution. The precipitate was washed with distilled water and dried to obtain a precipitated protein isolate. The acid soluble protein solution was passed through another series of membrane processing stages for further purification.

Most of the solids and protein were recovered in the meal residue (MR) (66.4%, 62.1%, respectively, in test 3 at 45 C). The protein losses into permeate were 6.77% (of starting material), with lower protein solubilities and losses at the lower temperatures, tests 1 and 2.

Conditions for the next tests (tests 4-8) were similar to the previous tests but the starting material was ground. Two runs (tests 4 and 5) were with ground rapeseed meal at pH 11, and 45° C., and similar results were achieved. However, grinding of starting material caused a small increase in mass yield of PPI (from 9.4% to 10.9%) and SPI (from 4.85% to 5.3%). There was a slight effect on protein yield of PPI (21.1% to 21.6%), SPI (from 9.7 to 10.3%) and MR (from 62.1% to 60.8%).

Another 3 tests (tests 6-8) with ground meal were carried out at pH 12. The pH change from 11 to 12 increased the mass yield from 10.9% to 16.9% of PPI and the protein yield of PPI from 21.6% to 36.6% (as % of starting material). The protein concentration in PPI, SPI and MR was 85.8%, 79.2% and 29.6%, respectively. The mass yield and protein recovery of SPI decreased insignificantly from 5.3% to 5% and from 10.3% to 10%, respectively, compared to previous experiments. The protein losses into permeate were 8.5%. The mass yield (55%) and protein recovery (41.2%) of MR were expectedly lower compared to the previous experiments.

In addition to the pH change from 11 to 12, in tests 7 and 8, the rapeseed meal was treated with an enzyme. The tests with enzymes were done as described in example 2 except that at the beginning, rapeseed meal (ground) was enzyme-treated with Enzeco hemicellulase concentrate (S19482, powder) from *Aspergillus niger* at pH 4.5 and 45° C. for 3 hours. The enzyme was added at 0.3 g per 30 g ground meal. After 3 hours of incubation, the solution was alkaline extracted at pH 12 and 45° C. for 30 minutes and the procedure then followed as described in example 2. Although the remaining protein in the meal residue was the lowest at 27.8% (as % of starting material), commensurate with the higher protein solubility, the enzyme treatment did not have a significant effect on mass and protein yields of the products. This test was done twice and in the first test, the second ultra- and diafiltration were omitted. Therefore, the protein concentration of SPI was very low (46.6%) and the mass yield of SPI very high. The enzyme reduced the mass of the meal residue (break down the polysaccharides) but it did not increase the protein recovery of PPI. Instead, protein losses to the permeate increased from 8.5% to 22%. Thus, the proteins obtained by enhanced extractability consisted substantially of low molecular weight fractions which were able to pass the 5 kD membrane and would need to be recovered separately.

In general, the total phenolic content of meal residue was low less than 253 mg/100 g sample, which makes the meal residue a high-quality protein supplement as an animal feed. The total phenolic content in SPI (156 mg/100 g) was higher than in PPI (76.2 mg/100 g) but significantly lower compared to the standard requirement (200 mg/100 g).

All results of the experiments for Example 3 carried out at different process conditions and described above are shown in Table 3.

|  | Test 1 | Test 2 | Test 3 | Test 4 |
| --- | --- | --- | --- | --- |
| Process conditions | pH 11, 26° C., unground meal no enzyme | pH 11, 24° C., unground meal no enzyme | pH 11 45° C. unground meal no-enzyme | pH 11, 45° C. ground meal no-enzyme |

-continued

|  |  | Test 1 | | Test 2 | | Test 3 | | Test 4 | |
|---|---|---|---|---|---|---|---|---|---|
| Protein content in: (moisture-free basis) | PPI | 91.8% | | 92.8% | | 88.2% | | 79.1% | |
|  | SPI | 69.6% | | 65.2% | | 79.6% | | 76.6% | |
|  | MR | 40.5% | | 40.2% | | 37.1% | | 36.4% | |
| Mass yield of: g Mass as % of meal mass: % | PPI | 1.09 g | 3.9% | 1.04 g | 3.8% | 2.6 g | 9.4% | 2.9 g | 10.5% |
|  | SPI | 1.35 g | 4.9% | 1.06 g | 3.8% | 1.3 g | 4.85% | 1.58 g | 5.7% |
|  | MR | 21.5 g | 78.1% | 20.8 g | 75.3% | 18.3 g | 66.4% | 18.2 g | 65.9% |
| Protein recovery in: Protein yield as % of starting meal(%) | PPI | 1 g | 9.15% | 0.97 g | 8.8% | 2.3 g | 21.1% | 2.29 g | 21% |
|  | SPI | 0.94 g | 8.6% | 0.7 g | 6.4% | 1.06 g | 9.7% | 1.2 g | 11% |
|  | MR | 8.7 g | 79.5% | 8.9 g | 81.7% | 6.8 g | 62.1% | 6.6 g | 60.4% |
| Loss of protein to the permeates(g); (%) | | 0.27 g | 2.5% | 0.26 g | 2.38% | 0.74 g | 6.77% | 0.37 g | 3.38% |
| Unknown protein loss % | | 0.01 g | 0.1% | 0.09 g | 0.82% | 0.02 g | 0.2% | 0.45 g | 4.1% |
| Total phenolic content in MR; PPI; SPI, mg/100 g | | 253 (MR) | | 210 (MR) | | N/A | | 102.9 (MR) | |

|  |  | Test 5 | | Test 6 | | Test 7 | | Test 8 | |
|---|---|---|---|---|---|---|---|---|---|
| Process conditions | | pH 11, 45° C. ground meal no-enzyme | | pH 12, 45° C., ground meal no enzyme | | pH 12, 45° C., ground meal enzyme-treated | | pH 12, 45° C., ground meal enzyme-treated | |
| Protein content in: (moisture-free basis) | PPI | 80.4 | | 85.8% | | 78.2% | | 78.2% | |
|  | SPI | 77.9% | | 79.2% | | **46.6% | | 70% | |
|  | MR | 37.3% | | 29.6% | | 26.1% | | 24.2% | |
| Mass yield of: g Mass as % of meal mass: % | PPI | 3.1 g | 11.3% | 4.7 g | 16.9% | 4.9 g | 17.9% | 5.1 g | 18.6% |
|  | SPI | 1.37 g | 4.9% | 1.4 g | 5% | 3.3 g | 12% | 1.7 g | 6.26% |
|  | MR | 17.9 g | 65% | 15.2 g | 55.% | 11.6 g | 42% | 11.5 g | 41.9% |
| Protein recovery in: Protein yield as % of starting meal(%) | PPI | 2.5 g | 23.1% | 4 g | 36.6% | 3.86 g | 35% | 4.01 g | 36.7% |
|  | SPI | 1.05 g | 9.6% | 1.1 g | 10% | 1.6 g | 14.3% | 1.2 g | 11% |
|  | MR | 6.7 g | 61.2% | 4.5 g | 41.2% | 3.0 g | 27.8% | 2.8 g | 25.6% |
| Loss of protein to the permeates(g); (%) | | N/A | | 0.92 g | 8.5% | 2.2 g | 20.2% | 2.6 g | 23.8% |
| Unknown protein loss % | | 6% | | 0.4 g | 3.6% | 0.26 g | 2.4% | 0.31 g | 2.4% |
| Total phenolic content in MR; PPI; SPI, mg/100 g | | N/A | | N/A | | N/A | | 76.2; 51.4; 156 | |

(Protein mass at the beginning 10.92 g out of total mass 30 g (36.4 ± 0.39% Pasis, ~40% moisture-free basis)
**no ultrafiltration;
N/A—not analyzed

Example 4

Examples 4.1-4.3 show results of processes carried out on a pilot scale. Each example was carried out as follows:

Typically 15 kg of meal was used, with 120 kg of water added. The time for acid extraction and enzymes was at least two hours. In a few cases the enzyme(s) were added and left overnight (~12+ hours), with the work continuing in the morning. pH values were 4-5 for acid and enzyme treatment and 11-12 for caustic extractions. Sodium chloride (NaCl, salt) was added, to reach an approx. 0.05 molar concentration (3 g/liter) so as to maintain a high ionic concentration in the solution which does reduce the risk of phenolic compounds attaching to the dissolved proteins.

The extract solution was separated from the solids by use of a small industrial decanter centrifuge. In most cases the solids were washed again with additional water, typically 60-70 kg, and decanted again.

The original extract and the washing liquid were combined, their pH brought down to 10-10.5 and then put through a separator centrifuge to remove the last solid particles. Ultra- and diafiltration of the clear liquid followed, using initially a 10 kD (kilodalton) and subsequently a 5 kD polymeric membrane filter. Ultrafiltration reduced the original volume by a factor of 3 to 10 or even higher and for diafiltration 2-4 volumes of water (at the same pH of ~10) were used.

Acid addition, usually hydrochloric, sometimes phosphoric, caused precipitation of most of the protein at a pH of typically 4.5 to 5.0, a few times 6.0.

The precipitated protein was separated, then washed, and separated again in the centrifuge. A small amount of lecithin was added and then the precipitate was dried in a spray dryer. The remaining solution was again ultra- and diafiltered, at the precipitation pH, neutralized with a small amount of sodium hydroxide, lecithin added, and then dried in the spray dryer.

The wet residual meal was usually sampled and then discarded. The same fate awaited the solid component from the separator, in both cases with a few exceptions, to provide also some dried samples of both of those byproducts.

Example 4.1

15 kg of meal containing 34.5% protein was mixed in the extraction tank with 130 kg of water. The mixture was brought to a pH of 4.5 by the addition of 825 ml of 1:1 HCl solution and held at that pH and a temperature of 46° C. for about 35 minutes, to yield a treated meal and a first solution of proteins. Then sodium hydroxide, NaOH, solution (30%) was added to slowly raise the pH, to yield a meal residue, and a second solution of proteins. At pH=7, 250 g of sodium sulfite, $Na_2SO_3$, was added as an antioxidant and additional NaOH thereafter to raise pH to 12.0. After 10-15 minutes, the mixture was separated using a decanter centrifuge into a liquid (i.e. a second solution of proteins) and a (wet) solid stream (i.e. a meal residue). Both streams were weighed and samples taken. The meal residue was then washed with 110 kg of water in the extraction tank and separated again. The washed residue was weighed, sampled and then discarded.

The two liquid streams (i.e. the second solution of protein and the washing liquid) were mixed, their pH lowered to 10.5 and then sent to a separator centrifuge where substantially all undissolved matter was removed (at a g-value of about 9000). The solids were again weighed, sampled and discarded. The clear liquid was taken to the next step of processing—membrane separations. At this point material balances indicated a total mass loss of 11 kg and a protein loss of 0.77 kg.

The amount of that liquid was 158 kg and it contained 1.44 kg protein. Ultrafiltration with a polymeric membrane designed for 5 kD (kilodalton) molecular weight separation was used, with the liquid volume reduced to 26 kg. Diafiltration followed, with the addition of 54 kg of distilled water. Protein losses in the permeate amounted to about 0.280 kg, leaving the amount of protein in the cleaned retentate at about 1.16 kg. Directly measured protein losses amounted to 0.162 kg, leaving an unaccounted-for loss of about 0.118 kg.

The next step was precipitation of the protein to yield a third solution of proteins and a precipitated protein product. This was done at a pH of 4.5 and included addition of 28 kg water. Separation of the solids was carried out in the separator centrifuge. The resultant 32 kg of wet solids were washed with 43 kg of water and separated again. 21 kg wet solids containing 0.53 kg of protein were sent to the spray dryer. A sample of wet solids was dried. The protein concentration in the dried precipitated protein product was 77 percent.

The separated liquid, 29 kg, was combined with the washing liquid, 54 kg, and the feed stream of 83 kg contained 0.23 kg protein. It was again ultra- and diafiltered. A sample of the retentate was dried and the resultant soluble protein product contained 79 percent protein.

Both products had a typical, acceptable slightly brownish colour and were bland in taste.

Example 4.2

15 kg of meal containing 34.5% protein was mixed in the extraction tank with 110 kg of water. The mixture was brought to a pH of 4.2 by the addition of 700 ml of 1:1 HCl solution and held at that pH and a temperature of 45° C. for about 15 minutes, to yield a first solution of proteins and a treated meal. Then 0.75 liters of Pectinase (Pextinex 5XL) was added and the mixture kept at the same temperature and pH of 4.4 for 2.5 hours. Without prior separation, NaOH was then added to slowly raise the pH and yield a meal residue and a second solution of proteins. At pH=7, 250 g of $Na_2SO_3$ was also added as an antioxidant after which the pH was raised to 11.0. After 15 minutes, the mixture was separated using a decanter centrifuge into a liquid and a (wet) solid stream. Both streams were weighed and samples taken. The solids were then washed with 80 kg of water in the extraction tank and separated again. The washed solids were weighed, sampled and then discarded.

The two liquid streams (i.e. the second solution of protein and the washing liquid) were mixed, and their pH lowered to 10.5 and then sent to a separator centrifuge where substantially all undissolved matter was removed. The solids were again weighed, sampled and discarded. The next step was precipitation of the protein. This was done at a pH of 5.0. Separation of the solids precipitated was carried out in the separator centrifuge. The first third of the separated solids was inadvertently discharged. The other two thirds were handled separately, using two different ways of washing the precipitate. The first lot, 6.5 kg, was washed with water, about 65 kg, in a 0.8 μm ceramic microfilter and then dried in the spray dryer, giving the product PPI-M. The second lot (10 kg) was washed in the separator centrifuge twice, first with 20 kg of water, with the second wash being with 23 kg of distilled water. The remaining solids were then dried, giving the product PPI-S.

The clear liquid separated from the precipitate, i.e. the third solution of proteins, was ultrafiltered at a pH of 6.5 and then diafiltered with the difference that the wash liquids from the microfilter and the separator after the first washing were used as diafiltration liquids first, followed by the distilled water wash liquid last. Protein losses to the permeate were frequently monitored. The retentate was sent to the dryer to get a soluble protein product.

Among the three products, PPI-M contained 74% protein, PPI-S 77% and the soluble product contained 71% protein. All products had acceptable colour and tasted bland. A few individual mass balances on protein were poor, but total balances and the overall results were acceptable.

Example 4.3

15 kg of meal containing 34.5% protein was mixed in the extraction tank with 120 kg of water. The mixture was brought to a pH of 4.0 by the addition of HCl and held at that pH for about 30 minutes to yield a treated meal and a first solution of proteins. After that mixture was separated using the decanter centrifuge, the treated meal was washed with 94 kg of water and separated again. Another 15 kg of feed was treated similarly, except that the amount of wash water was reduced, to 50 kg. The four liquid streams were combined, amounting to a total of 313 kg. That liquid was clarified using the separator centrifuge. The solids from the separator were weighed, sampled and discarded. The liquid, about 300 kg with a protein content of 0.49% was then ultra— and diafiltered with a high concentration factor and four diavolumes, to yield 21 kg of final retentate that was sent to drying.

The dried product contained 73% protein, was bland in taste and light in colour.

The wet solids from the decanter were weighed and about ⅔ of the total was left overnight with added water, 100 kg, and pectinase, at a pH of 4.4 and 46° C. temperature. In the morning, the pH was raised to 11, initially adding sodium carbonate ($Na_2CO_3$) and then sodium hydroxide (NaOH), to yield a second solution of proteins and a meal residue. After liquid-solid separation in the decanter, the solids were washed with an additional 81 kg of water in the extraction tank and separated again. The washed solids were weighed, sampled and then discarded. The two liquid streams were combined and, without further separation, precipitated at a pH of 6.0 to yield a precipitated protein product and a third solution of proteins. At that point, the amount of liquid containing a small amount of fine solids was 177 kg, holding 2.6 kg protein.

The precipitated solids were separated from the liquid in the separator centrifuge. The resultant 35 kg solids were washed on a 1.4 μm ceramic microfilter with about 60 kg of water. The washed solids were dried. The dried product contained 61% protein, lower than usually, as the fine solids had not been separated out. In other respects, colour and taste, it appeared good.

The liquid stream from the separator, 142 kg, was ultrafiltered with a concentration factor of about 15, then diafiltered using 40 kg of tap water followed by 43 kg of distilled water. The 9.6 kg of retentate was dried to yield a soluble protein product, which was a slightly dark product with a bland taste, containing 67% protein.

Comparing the soluble protein product and the acid extracted protein product, the one removed after acid extraction had excellent colour compared to the one obtained after the alkaline extraction, following precipitation of the acidinsoluble proteins. No analysis of their respective amino acid compositions or other properties was undertaken.

It will be appreciated that certain features, which are, for clarity, described in the context of separate embodiments or separate aspects, may also be provided in combination in a single embodiment. Conversely, various features which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A process for isolation of at least three different protein products from a defatted meal, the defatted meal selected from the group consisting of rapeseed meal, soybean meal, cottonseed meal, and sunflower seed meal, the process comprising the steps of:
   a. extracting the defatted meal with an acidic solvent at a pH of between 2 and 6 to obtain a mixture of treated meal and a first solution of proteins;
   b. after step a., extracting the treated meal with an alkaline solvent at a pH of between 9 and 12.5 to obtain a mixture of meal residue and a second solution of proteins;
   c. after step b., separating the meal residue from the second solution of proteins;
   d. after step c., adjusting the pH of the second solution of proteins to between about 2 and about 9 to obtain a precipitated protein product and a third solution of proteins;
   e. after step d., separating the precipitated protein product from the third solution of proteins; and
   f. after step e., membrane processing the third solution of proteins to separate the soluble proteins from the third solution of proteins to obtain a soluble protein product;
   wherein the step a. is carried out in the presence of cellulase enzymes, or further comprises incubating the treated meal with cellulase enzymes prior to extracting the treated meal with the alkaline solvent.

2. The process of claim 1, further comprising separating the first solution of proteins from the treated meal prior to extracting the treated meal with an alkaline solvent.

3. The process of claim 2, further comprising separating the proteins from the first solution to obtain an acid extracted protein product.

4. The process of claim 1, wherein step b. is carried out in the presence of the first solution of proteins, such that the second solution of proteins comprises the proteins extracted in step a. and the proteins extracted in step b.

5. The process of claim 1, wherein prior to step d., the process further comprises:
   i. separating fine particulates from the second solution of proteins to obtain a feed concentrate.

* * * * *